United States Patent [19]

Ehricke et al.

[11] Patent Number: 5,079,769
[45] Date of Patent: Jan. 7, 1992

[54] FLEXIBLE MULTIPLEXER

[75] Inventors: Claus Ehricke, Munich, Fed. Rep. of Germany; Thomas Aepli, Schwerzenbach, Switzerland

[73] Assignee: Siemens Aktiengesellschaft, Munich, Fed. Rep. of Germany

[21] Appl. No.: 515,445

[22] Filed: Apr. 27, 1990

[30] Foreign Application Priority Data

May 3, 1989 [EP] European Pat. Off. .......... 89108059

[51] Int. Cl.[5] ......................... H04J 3/04; H04Q 11/04
[52] U.S. Cl. .................................. 370/112; 370/58.3; 370/67; 370/85.1
[58] Field of Search ...................... 370/112, 58.1, 58.2, 370/58.3, 59, 110.1, 53, 55, 56, 67, 84, 85.1, 63; 340/825.03, 826, 825.06, 825.79

[56] References Cited

U.S. PATENT DOCUMENTS

| | | | |
|---|---|---|---|
| 4,317,962 | 3/1982 | Cox et al. | 370/58.3 |
| 4,546,468 | 10/1985 | Christmas et al. | 370/58.2 |
| 4,685,101 | 8/1987 | Segal et al. | 370/112 |
| 4,787,081 | 11/1988 | Waters et al. | 370/85.1 |

OTHER PUBLICATIONS

"PDMX*—Programmable Primary Level Digital Multiplexer", Siemens AG, Bereich übertragungssysteme, Order No. A402020-5154-A1-1-7629, 1988.

Primary Examiner—Douglas W. Olms
Assistant Examiner—Alpus H. Hsu
Attorney, Agent, or Firm—Hill, Van Santen, Steadman & Simpson

[57] ABSTRACT

A flexible multiplexer enables a liberal grouping and distribution of time slots of digital multiplex signals on dedicated lines with increasing numbers of connection units on the subscriber side and the line side. The accommodation of the numerous voice/data and signaling multiplex signal lines between the connection units thereby causes increasing numbers of problems. A reduction of the multiplex signal lines occurs when all channel units in the connection units of the subscriber side and all connection units of the line side are no longer connected to each multiplex line, but groups of connection units of the subscriber side and all connection units of the line side are each respectively connected via an incoming and an outgoing voice/data multiplex signal line to a voice/data switching matrix network and are connected via an incoming and an outgoing signaling multiplex signal line to an signaling switching matrix network. Such a flexible multiplexer enables connections between connection units of the subscriber side, enables a grouping and separating of multiplex signals between connection units of the subscriber side and of the line side and also enables a channel distribution between connection units of the line side.

4 Claims, 5 Drawing Sheets

FIG 2 (PRIOR ART)

*Figure shows a prior art diagram with channel units (K) on the left side operating at 64 kbit/s, connected through a subscriber side connection unit to time/space/space couplers (21, 22) and space/space/time couplers (23, 24) on the right side operating at 2.048 Mbit/s. Signals S/D and Kz are shown at inputs/outputs 16, 17, 18, 19 (each 8*), with internal connection numbering 101–138, 121–138, etc.*

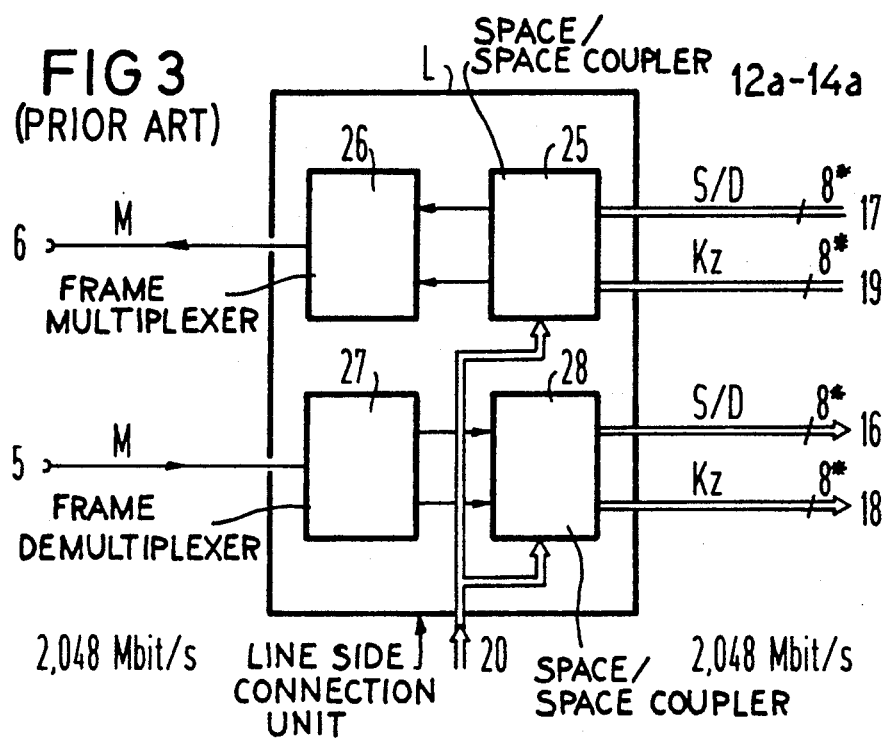
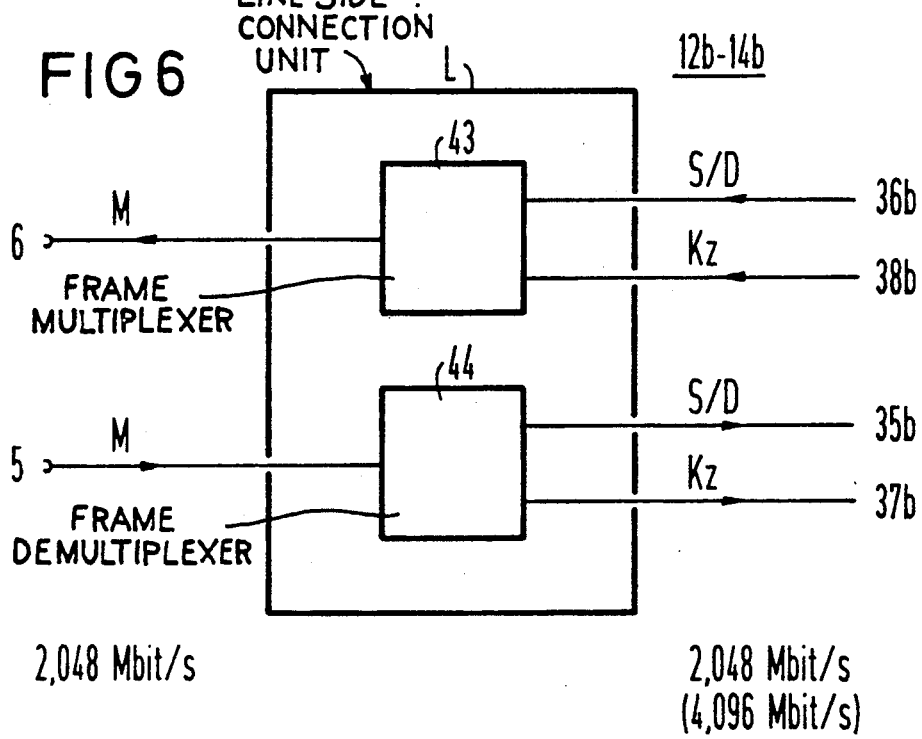

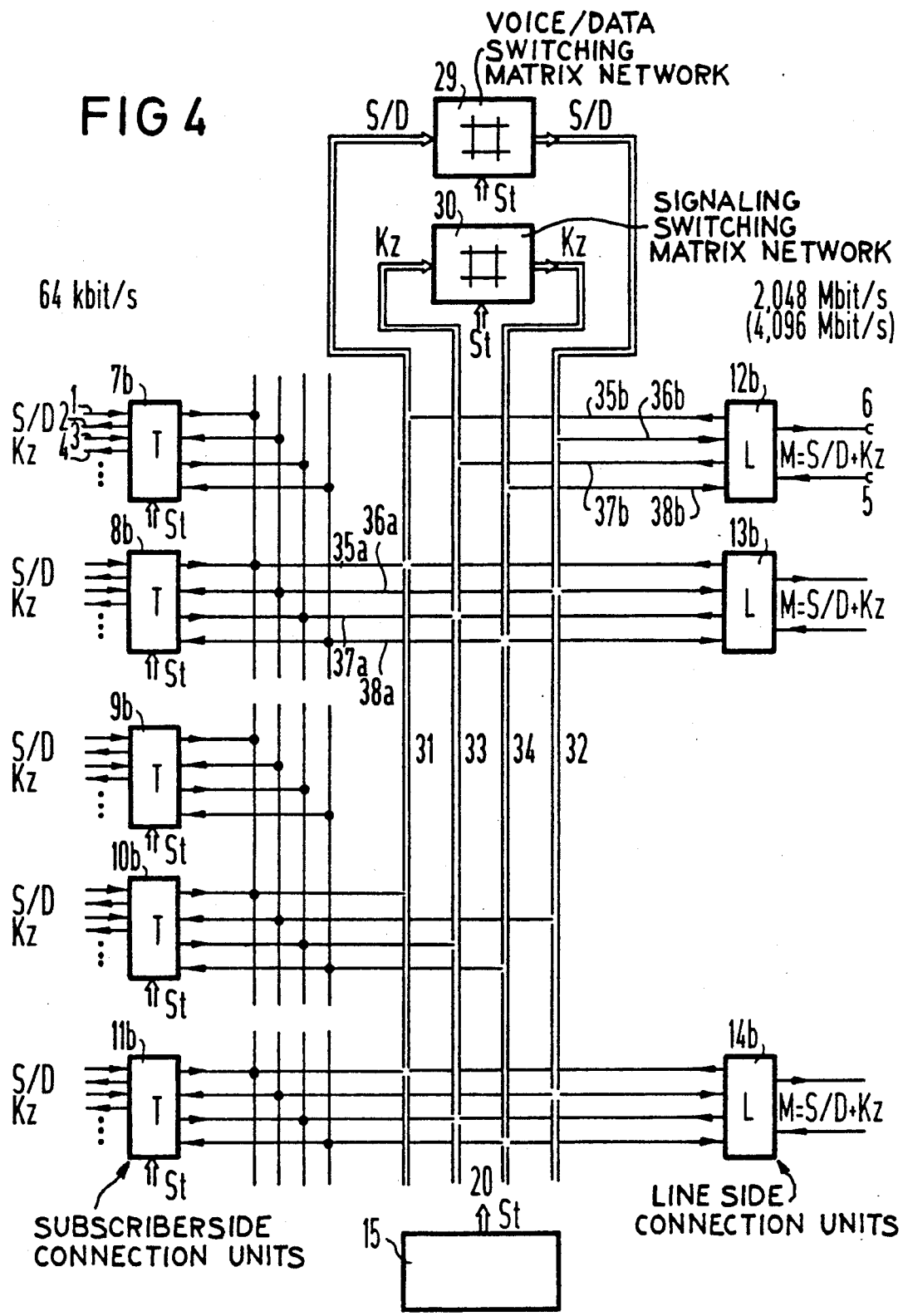

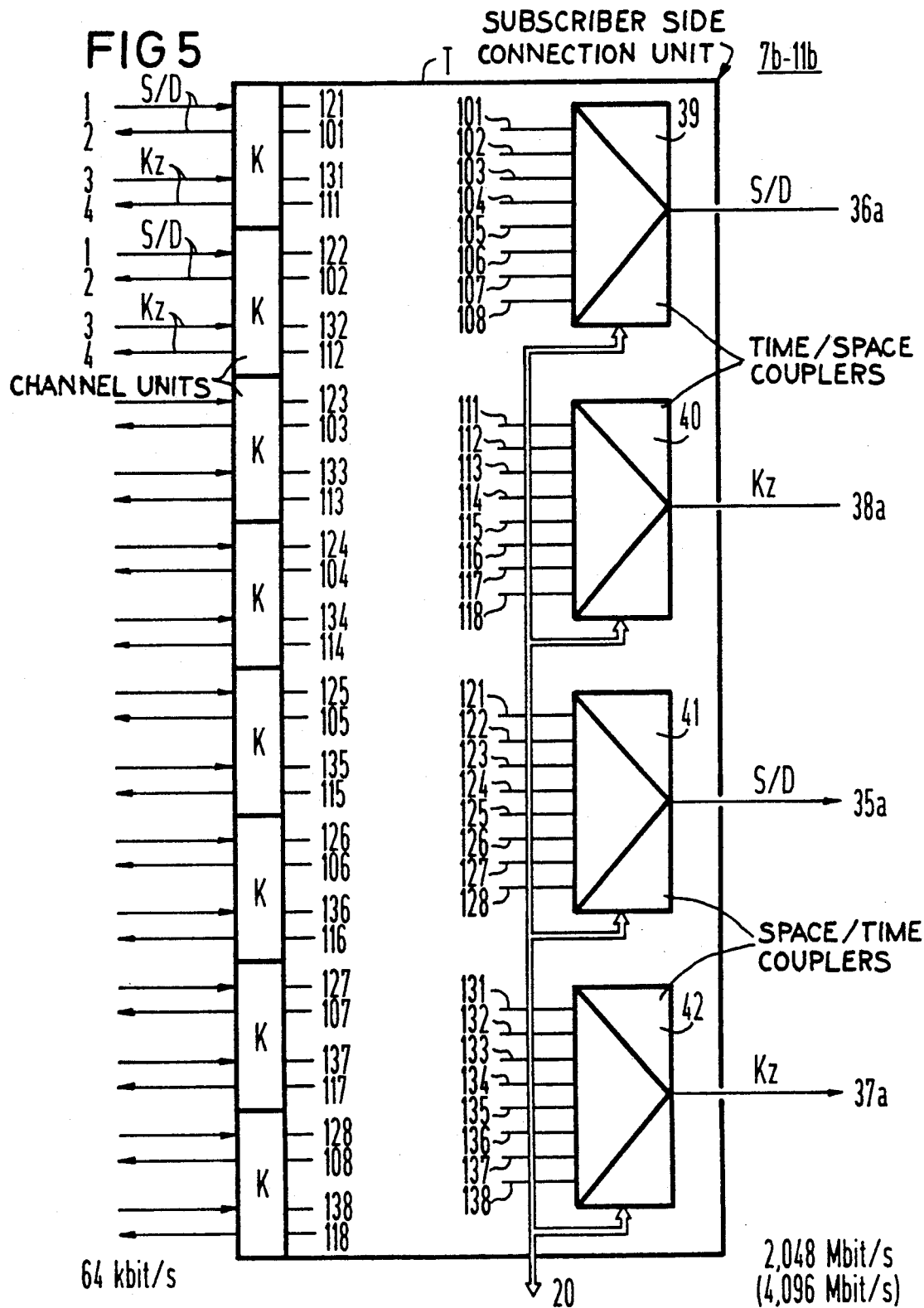

FLEXIBLE MULTIPLEXER

BACKGROUND OF THE INVENTION

1. Field of the Invention

The present invention relates to a flexible multiplexer having connection units at the subscriber side that contains channel units respectively having an external voice/data input, an external voice/data output, and external signaling input and an external signaling output, having connection units at the line side that contain an external multiplex signal input and an external multiplex signal output, with voice/data multiplex lines and with signaling multiplex lines that connect the connection units, and with a control device that is connected to the connection units via a control bus.

2. Description of the Prior Art

A multiplex device of the type generally set forth above is known from the publication "PDMX-Programmierbarer Digitalmultiplexer fuer die 2-Mbit/s-Netzebene", published by Siemens AG, Bereich Ubertragungssysteme, Post Office Box 700073, Order No. A42020-S154-A1-2-29.

This flexible multiplexer enables a liberal grouping and distribution of time slots of digital multiplex signals in a time-division multiplex equipment. Connections between connection units of the subscriber side, connections of a plurality of connection units of the subscriber side with one or more connection units at the line side and/or a channel distribution (cross-connect) between connection units at the line side are possible. The signaling are converted such that they occupy channels corresponding to voice or data signals. What are to be understood by connection units of the subscriber side are telephone equipment, data equipment and subrate multiplex equipment. Connection units of the line side serve the purpose of transmitting or of receiving multiplex signals having, for example, bit rates of 1.544 Mbit/s or 2.048 Mbit/s.

In the known flexible multiplexer, all channel units of all connection units of the subscriber side and all connection units of the line side can be connected to one another via a bus system having a plurality of multiplex lines.

SUMMARY OF THE INVENTION

The object of the present invention is to simplify the flexible multiplexer, particularly for that case in which an extremely great plurality of connection units is to be serviced.

The above object is achieved, according to the present invention in a flexible multiplexer comprising connection units of the subscriber side that have channel units which each respectively have an external voice/data input, an external voice/data output, an external signaling input and an external signaling output, comprising connection units of the line side that contain an external multiplex signal input and an external multiplex signal output, comprising voice/data multiplex signal lines and signaling multiplex signal lines that connect the connection units, and comprising a control device that is connected to the connection units via a control bus, and is particularly characterized in that the connection units of the subscriber side are each respectively equipped with an internal connection for an "incoming" voice/data multiplex line, for an "incoming" signaling multiplex signal line, for an "outgoing" voice/data multiplex line and for an "outgoing" signaling multiplex signal line, and contain a first time/space coupler that connects the channels on the "incoming" voice/data multiplex line to selected external voice/data outputs, a second time/space coupler that connects channels on the "incoming" signaling multiplex signal line to selected signaling outputs, first space/time coupler that connects external voice/data inputs to selected channels on the "outgoing" voice/data multiplex signal line, and a second space/time coupler that connects external signaling inputs to selected channels on the "outgoing" signaling multiplex signal line, in that the connection units of the line side are each provided with a respective internal connection for an "incoming" voice/data multiplex signal line, for an "incoming" signaling multiplex signal line, for an "outgoing" voice/data multiplex signal line and for an "outgoing" signaling multiplex signal line, and contain a frame multiplexer that interleaves the voice/data signals on the "incoming" voice/data multiplex signal line and the signaling on the "incoming" signaling multiplex signal line and outputs the same to the external multiplex signal output, and contains a frame demultiplexer that separates the voice/data signals and the signaling at the external multiplex signal input and outputs the same to the "outgoing" voice/data multiplex signal line and to the "outgoing" signaling multiplex signal line, in that a voice/data switching matrix network is provided, in that a signaling switching matrix network is provided, and in that only respectively one voice/data multiplex signal line is provided between a group of connection units of the subscriber side or, respectively, a connection unit of the line side, on the one hand, and the voice/data switching matrix network, on the other hand, and vice-versa, in that respectively only one signaling multiplex signal line is provided between a group of connection units of the subscriber side or, respectively, a connection unit of the line side, on the one hand, and the signaling switching matrix network, on the other hand, and vice-versa, and in that the control device is also connected via the control bus to the voice/data switching matrix network and to the signaling switching matrix network. "Incoming" and "outgoing" respectively refer to the connection unit under consideration.

According to a feature of the invention, the multiplexer is particularly characterized in that the channel units having an external voice/data input, an external voice/data output, an external signaling input and an external signaling output for respectively equal to or lower than 64 kbit/s are provided in the connection units of the subscriber side, time-space couplers are provided between the "incoming" multiplex signal lines and the channel units and space/time couplers are provided between the channel units and the "outgoing" multiplex signal lines.

According to another feature of the invention, the channel units having an external voice/data input, an external voice/data output, and external signaling input and an external signaling output for respectively equal to or lower than 32 kbit/s are provided in the connection units of the subscriber side, time/space couplers are provided between the "incoming" multiplex signal lines and the channel units and space/time couplers are provided between the channel units and the "outgoing" multiplex signal lines, and in that respectively two voice/data signals from external voice/data inputs and respectively two appertaining signaling signals at external signaling inputs having the respectively same destination direction are combined as duets in a channel time slot of the voice/data multiplex signal and of the signaling multiplex signal.

According to another feature of the invention, the multiplexer is particularly characterized in that channel units having an external voice/data input, an external voice/data output, an external signaling input and an external signaling output for respectively equal to or lower than 16 kbit/s are provided in the connection units of the subscriber side, time/space couplers are provided between the "incoming" multiplex signal lines and the channel units and space/time couplers are provided between the channel units and the "outgoing" multiplex signal lines, and in that respectively four voice/data signals at external voice/data inputs and respectively four appertaining signaling signals at external signaling inputs having the respectively same destination direction are combined as quartets in a respective channel time slot of the voice/data multiplex signal and of the signaling multiplex signal.

The present invention is based on the perception that the bus system becomes more simple when groups of connection units of the subscriber side and connection units of the line side are connected per direction to a voice/data switching matrix network and to a signaling switching matrix network via, respectively, only one multiplex line. The switching matrix networks thereby assume the liberal connections and are appropriately controlled by a control device.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 2 is a block circuit diagram of a connection unit of the subscriber side as known in the art;

FIG. 3 is a block circuit diagram of a connection unit of the line side as known in the art;

FIG. 4 is a block circuit diagram of a flexible multiplexer constructed in accordance with the present invention;

FIG. 5 is a block circuit diagram of a connection unit of the subscriber side constructed in accordance with the present invention; and FIG. 6 is a block circuit diagram of a connection unit of the line side constructed in accordance with the present invention.

DESCRIPTION OF THE PREFERRED EMBODIMENTS

Figure 1:
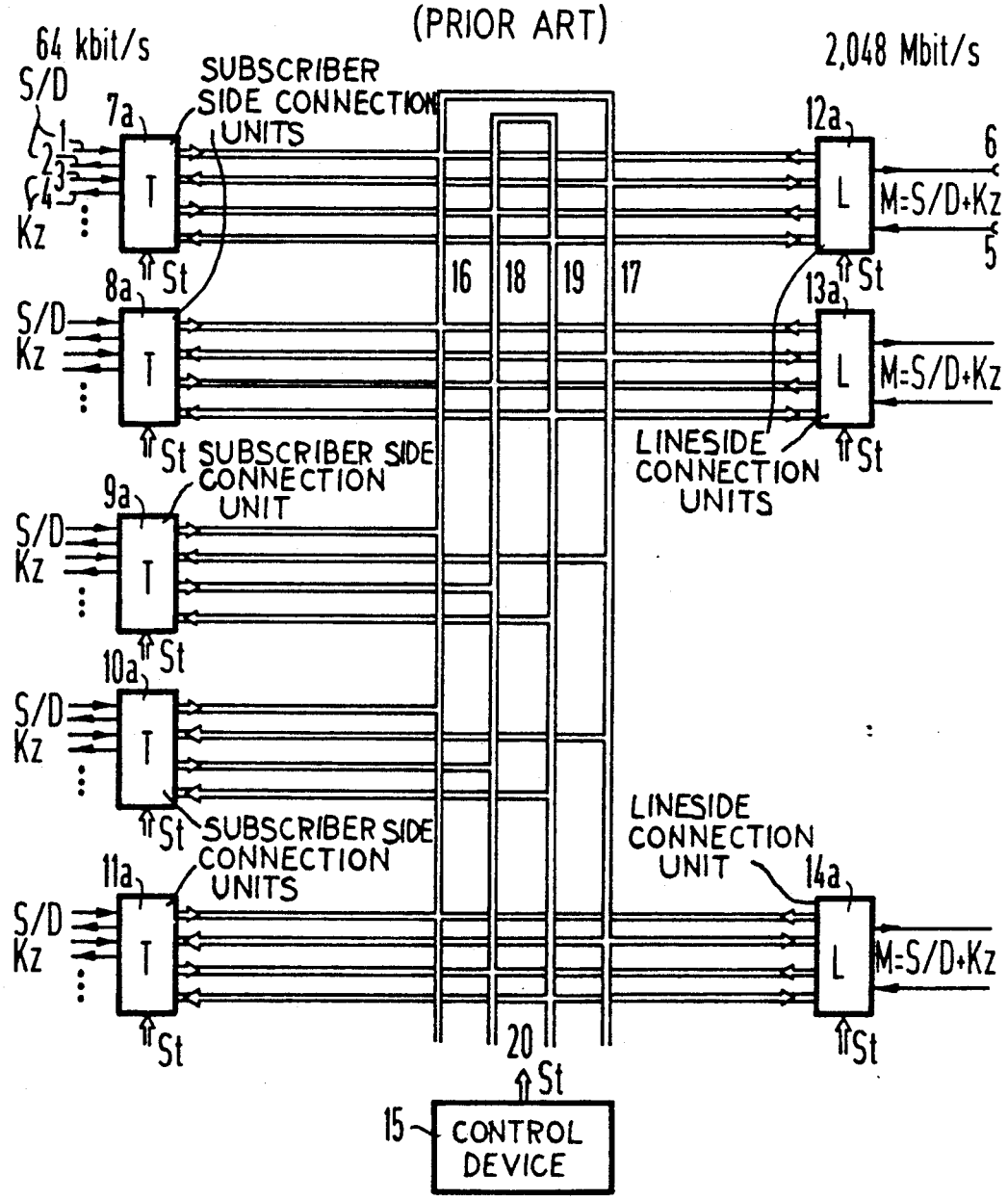
FIG. 1 is a block circuit diagram of a flexible multiplexer which is known in the art.

Referring to FIG. 1, a block circuit diagram of a known flexible multiplexer is illustrated as comprising a plurality of connection units 7a–11a of the subscriber side that are additionally referenced T, a plurality of connection units 12a–14a of the line side that are also referenced L, a control device 15, a pair of voice/data multiplex signal line groups 16 and 17, a pair of signaling multiplex signal line groups 18 and 19, and a control bus 20. Telephone signals, data and sub-rate multiplex signals, are referred together as voice/data signals S/D and signaling signals are referred to as Kz. The connection units shall be set forth before the operation of this multiplexer is explained.

Referring to FIG. 2, a known connection unit T of the subscriber side is illustrated as having eight channel units K, time/space/space couplers 21 and 22, and space/space/time couplers 23 and 24.

The channel units K are supplied with voice/data signals S/D via an external voice/data input 1 and with signaling signals Kz via an external signaling input 3. Voice/data signals S/D are taken via an external voice/data output 2 and signaling signals are taken via an external signaling output 4. In this case, voice/data signals S/D and signaling signals Kz have a bit rate of equal to or less than 64 kbit/s. The connections between the channel units K, on the one hand, and the time/space/space couplers 21 and 22 and the space/space/time couplers 23 and 24, on the other hand, are set forth in pairs of three-place numbers.

Voice/data signals S/D incoming in time slots via the voice/data multiplex signal line group 17 are converted in the time/space/space coupler 21 and are distributed onto the external voice/data outputs 2. Correspondingly, the signaling signals Kz incoming in time slots via the signaling multiplex signal line group 19 are converted in the time/space/space coupler 22 and are distributed onto the external signaling outputs 4. Numerals with an asterisk (*) indicate how many lines are contained in parallel in the line group. Voice/data signals S/D arriving at the external voice/data inputs 1 are supplied to a space/space/time coupler 23, are converted into time slots and are output via the voice/data multiplex signal line group 16. Correspondingly, the signaling signals Kz incoming at the external signaling inputs 3 are converted into time slots in the space/space/time coupler 24 and are output via the signaling multiplex signal line group 18.

FIG. 3 illustrates a known connection unit L of the line side. This connection unit L comprises space/space couplers 25 and 28, a frame multiplexer 26 and a frame demultiplexer 27.

Respectively one multiplex signal line from the voice/data multiplex signal line group 17 and from the signaling multiplex signal line group 19 is selected in the space/space coupler 25 by the control device 15. When 2.048 Mbit/s signals are involved, then the signaling signals Kz are converted into 4-bit signaling word in the frame multiplexer 26 and are inserted into the 16th time slot of a complete 2.048 Mbit/s signal M to be formed that is output via the external multiplex signal output 6. An opposite conversion occurs between the external multiplex signal input 5, on the one hand, and the voice/data multiplex signal line group 16, as well as the signaling multiplex signal line group 18, on the other hand. Connections between the connection units 7a–11a of the subscriber side or between a plurality of the connection units 7a–11a of the subscriber side and at least one connection unit 12a–14a of the line side can be produced in the flexible multiplexer of FIG. 1 via the voice/data multiplex signal line groups 16 and 17 and the signaling multiplex signal line groups 18 and 19. Further, a channel distribution between connection units 12a–14a of the line side can be implemented. In this flexible multiplexer, each multiplex signal line in each voice/data multiplex signal line group and each signaling multiplex signal line group of each connection unit T of the subscriber side is connected to each connection unit L of the line side.

FIG. 4 illustrates the block circuit diagram of a flexible multiplexer constructed in accordance with the present invention. This flexible multiplexer comprises connection units 7b-11b of the subscriber side, connection units 12b-14b of the line side, the control device 15, a voice/data switching matrix network 29, a signaling switching matrix network 30, voice/data multiplex signal line groups 31 and 32, signaling multiplex signal line groups 33 and 34, voice/data multiplex signal lines 35a, 35b, 36a and 36b, signaling multiplex signal lines 37a, 37b, 38a and 38b and the control bus 20. Here, also, the connection units shall be set forth first.

FIG. 5 illustrates a connection unit T of the subscriber side constructed in accordance with the present invention. This connection unit differs from the known unit of FIG. 2 in that the time/space couplers 39 and 40 and the space/time couplers 41 and 42 are connected to the bus system 31-34 only via a respectively one multiplex signal line 35a-38a.

The connection unit T of the subscriber side according to FIG. 5 can be modified such that twice or four times the plurality of channel units K are employed when these are designed for signals equal to or below 32 kbit/s or equal to or below 16 kbit/s. In the first case, for example, the terminals 121 and 122 of the channel unit side are connected to the terminal 121 of the space/time coupler 41 and the terminals 123 and 124 of the channel unit side are connected to the terminal 122 of the time/space coupler 41, etc. In the second case, for example, the terminals 121-124 of the channel unit side are interconnected to the terminal 121 of the space/time coupler 41, etc. FIG. 6 illustrates a connection unit L of the line side constructed in accordance with the present invention and having a frame multiplexer 43 and a frame demultiplexer 44. In contrast to the line side connection unit L of FIG. 3, only respectively one voice/data multiplex signal line 35b and 36b and only respectively one signaling multiplex signal line 37b and 38b is likewise connected here to the side of the bus system 31-34. Here, also, the signaling signals Kz are converted into 4-bit signaling words and vice-versa. In FIG. 4, the connection units T of the subscriber side are connected in groups. Therefore, for example, the connection units 7b and 8b of the subscriber side and further connection units of the subscriber side that are not shown form one line group that is respectively connected via four multiplex signal lines 35a-38a to the bus system 31-34 departing starlike from the switching matrix networks 29 and 30. The connection unit 12b of the line side, for example, is connected to the bus system 31-34 via four multiplex signal lines 35b-38b.

The flexible multiplexer constructed in accordance with the present invention differs from the known flexible multiplexer in that switching matrix functions are displaced from the connection units T of the subscriber side into the switching matrix networks 29 and 30.

Whereas an expansion to more connection units in the known flexible multiplexer is possible only by expanding the overall bus system, only the switching matrix networks need be expanded in the flexible multiplexer of the present invention and only additional multiplex lines have to be laid to the new connection units.

Internally, the flexible multiplexer constructed in accordance with the present invention can also be operated, for example, with a bit rate of 4.096 Mbit/s. As a result thereof, the plurality of connection units T of the subscriber side can be doubled given an unaltered plurality of multiplex signal lines. Two groups of connection units T of the subscriber side are then divided into the four multiplex signal lines 35a, 36a, 37a and 38a. Further, two connection units L of the line side can then respectively work in common on the four multiplex signal lines 35b, 36b, 37b and 38b.

The switching matrix networks 29 and 30 can be realized with integrated circuits of the type PEB 2040 and the connection units 7b-14b can be realized with, among other things, integrated circuits of the type PEB 2050.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A flexible multiplexer comprising:
   a plurality of subscriber side connection units each including an external voice/data input, an external voice/data output, an external signaling input and an external signaling output;
   a plurality of line side connection units each including an external multiplex signal input, and an external multiplex signal output;
   a plurality of voice/data multiplex signal lines connected to said plurality of subscriber side connection units;
   a plurality of signaling multiplex lines connected to said plurality of line side connection units;
   a control bus;
   a control device connected to said subscriber side connection units and to said line side connection units via said control bus;
   each of said subscriber side connection units comprising a plurality of internal connections for, respectively, an incoming voice/data multiplex signal line, an incoming signaling multiplex signal line, an outgoing voice-data multiplex signal line, and an outgoing signaling multiplex signal line, a first time/space coupler for connecting channels on the incoming voice/data multiplex signal line to selected external voice/data outputs, a second time/space coupler for connecting channels on the incoming signaling multiplex signal line to selected external signaling outputs, a first space/time coupler for connecting external voice/data inputs to selected channels on the outgoing voice/data multiplex signal line, and a second space/time coupler for connecting external signaling inputs to selected channels on the outgoing signaling multiplex signal line;
   each of said line side connection units comprising a plurality of internal connections for, respectively, an incoming voice/data multiplex signal line, an incoming signaling multiplex signal line, an outgoing voice/data multiplex signal line and an outgoing signaling multiplex signal line, a frame multiplexer for interleaving voice/data signals on the incoming voice/data multiplex signal line and signaling signals on the incoming signaling multiplex signal line and output the same to the external multiplex signal output, and a frame demultiplexer for separating voice/data signals and signaling signals at the external multiplex signal input and output the same separated to the outgoing voice/data multiplex signal line and to the outgoing signaling multiplex signal line;

a voice/data switching matrix network;
a signaling switching matrix network;
only a respective single voice/data multiplex signal line connected between a group of said subscriber side connection units or a respective line side connection unit, on the one hand, and said voice/data switching matrix network, on the other hand, and vice-versa;
only a respective single signaling multiplex signal line connected between a group of subscriber side connection units or a respective line side connection unit, on the one hand, and said signaling switching matrix network, on the other, and vice-versa; and
said control device connected to control said voice/data switching matrix network, and to control said signaling switching matrix network to control said subscriber side connections and to control said line side connections via said control bus.

2. The flexible multiplexer of claim 1, wherein each of said subscriber side connection units comprises:
a plurality of channel units each including an external voice/data input, an external voice/data output, an external signaling input and an external signaling output for equal to or less than 64 kbit/s;
a plurality of time/space couplers connected between the incoming multiplex signal lines and said channel units; and
a plurality of space/time couplers connected between the channel units and the outgoing multiplex signal lines.

3. The flexible multiplexer of claim 1, wherein each of said subscriber side connection units comprises:
a plurality of channel units each including an external voice/data input, an external voice/data output, an external signaling signal input and an external signaling signal output for equal to or less than 32 kbit/s;
a plurality of time/space couplers connected between the incoming multiplex signal lines and said channel units;
a plurality of time/space couplers connected between the channel units and the outgoing multiplex signal lines;
and wherein respectively two voice/data signals from the external voice/data inputs and respectively two appertaining signaling signals at the external signaling signal inputs and having the respective same destination direction are combined as duets in a channel time slot of the voice/data multiplex signal and of the signaling multiplex signal.

4. The flexible multiplexer of claim 1, wherein each of said subscriber side connection units comprises:
a plurality of channel units each including an external voice/data input, and external voice/data output, an external signaling signal input and an external signaling signal output for equal to or less than 16 kbit/s;
a plurality of time/space couplers connected between the incoming multiplex signal lines and said channel units; and
a plurality of space/time couplers connected between the channel units and the outgoing multiplex signal line;
and wherein respectively four voice/data channels from the external voice/data inputs and respectively four appertaining signaling signals at the external signaling signal inputs and having the respective same destination direction are combined as quartets in a respective channel time slot of the voice/data multiplex signal and of the signaling multiplex signal.

* * * * *